(12) United States Patent
Lu et al.

(10) Patent No.: US 12,239,902 B2
(45) Date of Patent: *Mar. 4, 2025

(54) GAME CONTROLLER WITH SLIDABLE CONNECTOR

(71) Applicant: DEXIN CORP., New Taipei (TW)

(72) Inventors: Ho Lung Lu, New Taipei (TW); Ya-Hsiu Tsai, New Taipei (TW)

(73) Assignee: DEXIN CORP., New Taipei (TW)

( * ) Notice: Subject to any disclaimer, the term of this patent is extended or adjusted under 35 U.S.C. 154(b) by 328 days.

This patent is subject to a terminal disclaimer.

(21) Appl. No.: 17/954,925

(22) Filed: Sep. 28, 2022

(65) Prior Publication Data

US 2023/0105244 A1    Apr. 6, 2023

Related U.S. Application Data

(60) Provisional application No. 63/252,339, filed on Oct. 5, 2021.

(30) Foreign Application Priority Data

Dec. 17, 2021 (TW) .................................. 110147479

(51) Int. Cl.
*A63F 13/24* (2014.01)

(52) U.S. Cl.
CPC ...... *A63F 13/24* (2014.09); *A63F 2300/1043* (2013.01)

(58) Field of Classification Search
CPC .. A63F 13/24; A63F 2300/1043; A63F 13/92; A63F 13/98
See application file for complete search history.

(56) References Cited

U.S. PATENT DOCUMENTS

| | | | | |
|---|---|---|---|---|
| 2012/0008272 | A1* | 1/2012 | Lu | H05K 5/0278 361/679.32 |
| 2013/0029763 | A1* | 1/2013 | Zhou | A63F 13/213 463/37 |
| 2015/0273325 | A1* | 10/2015 | Falc | A63F 13/24 463/37 |
| 2015/0281422 | A1* | 10/2015 | Kessler | H04M 11/007 455/557 |
| 2018/0193731 | A1* | 7/2018 | Oizumi | A63F 13/92 |
| 2020/0398171 | A1* | 12/2020 | McDole | A63F 13/98 |
| 2021/0197078 | A1* | 7/2021 | Yildiz | G06F 1/1613 |
| 2021/0275907 | A1* | 9/2021 | Khaira | A63F 13/92 |
| 2021/0308566 | A1* | 10/2021 | Kong | A63F 13/92 |

* cited by examiner

*Primary Examiner* — Justin L Myhr
(74) *Attorney, Agent, or Firm* — Maschoff Brennan

(57) ABSTRACT

A game controller includes a holder, two control handles, and an electrical connector. The holder has an accommodation space. The accommodation space is configured to accommodate a mobile device. The control handles are respectively mounted on two opposite sides of the holder. The electrical connector is slidably disposed on one of the control handle. The electrical connector is slidable to be partially located in the accommodation space or withdrawn from the accommodation space.

10 Claims, 8 Drawing Sheets

GAME CONTROLLER WITH SLIDABLE CONNECTOR

CROSS-REFERENCE TO RELATED APPLICATIONS

This non-provisional application claims priority under 35 U.S.C. § 119(a) on provisional patent application No. 63/252,339 filed in U.S.A. on Oct. 5, 2021, and on patent application No. 110147479 filed in Taiwan, R.O.C. on Dec. 17, 2021, the entire contents of which are hereby incorporated by reference.

TECHNICAL FIELD

The disclosure relates to a game controller, more particularly to a game controller which is applied to a mobile device.

BACKGROUND

As the progress of a mobile phone (e.g., iPhone® or phone for Android™) with a touch screen, mobile games become more and more popular. Some mobile games gain more profit than traditional video games or computer games.

In order to enhance user experience during playing the mobile games, some developers provide external game controllers cooperating with the mobile phones. When a mobile phone is installed onto a game controller, an electrical connector of the game controller is inserted into an electrical jack of the mobile phone for building a signal communication between the game controller and the mobile phone. However, a length of the electrical connector of the game controller is constant and merely suitable for the mobile phone without a protective casing. Therefore, when the mobile phone with the protective casing are installed on the game controller, the total length of the mobile phone with the protective casing may cause an unsuccessful connection between the electrical connector of the game controller and the electrical jack of the mobile phone. In other words, the existing game controller is not designed for both cases where the mobile phone is with and without the protective casing.

SUMMARY

The disclosure provides a game controller which is suitable for both cases where the mobile phone is with and without the protective casing.

One embodiment of the disclosure provides a game controller adapted for a mobile device. The game controller includes a holder, two control handles, and an electrical connector. The holder has an accommodation space. The accommodation space is configured to accommodate the mobile device. The control handles are respectively mounted on two opposite sides of the holder. The electrical connector is slidably disposed on one of the control handle. The electrical connector is slidable to be partially located in the accommodation space or withdrawn from the accommodation space.

According to the game controller as discussed in the above embodiment, the electrical connector is slidable relative to the control handle, such that the length of the electrical connector protruding from the control handle can be adjusted according to the total length of the mobile device with or without the protective casing. Therefore, the game controller is suitable for both cases where the mobile device is with and without the protective casing.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
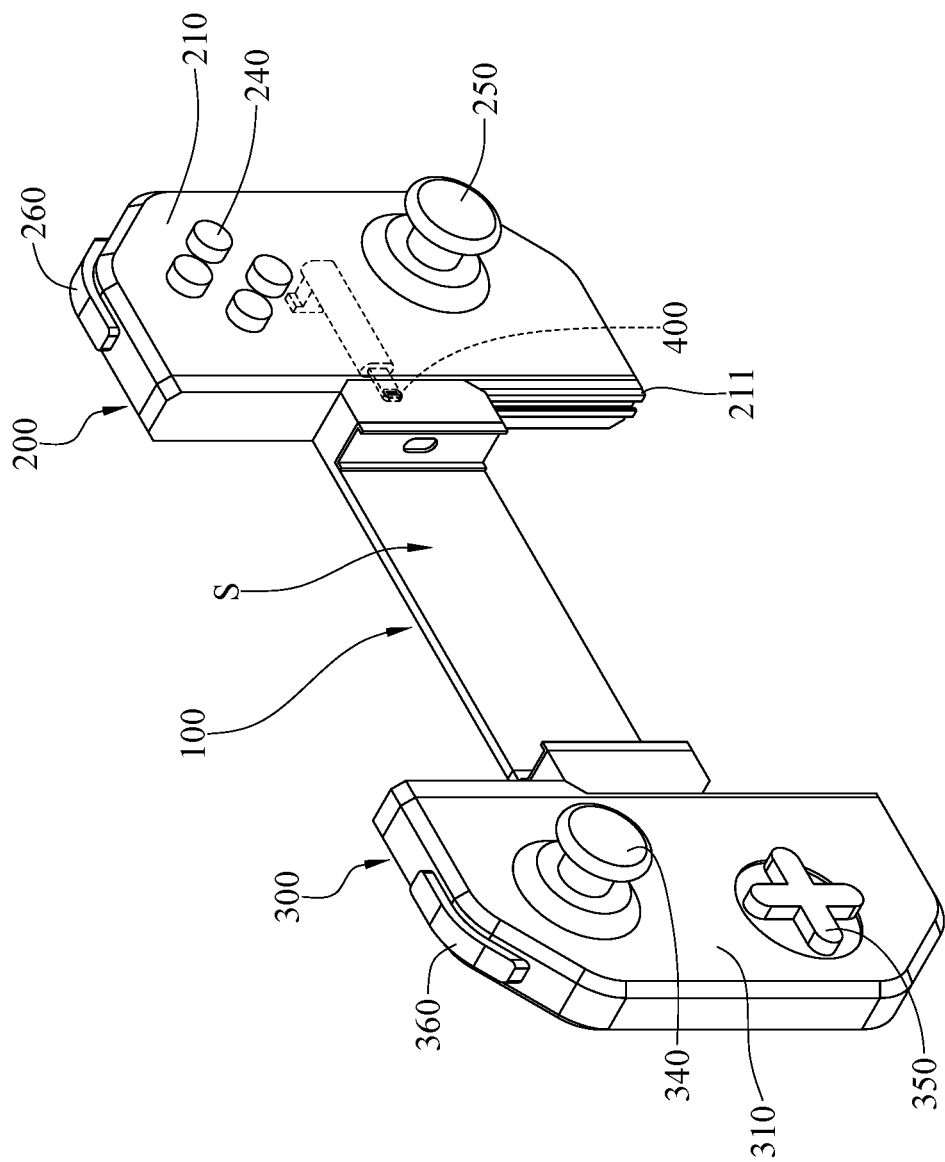
FIG. 1 is a perspective view of a game controller according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
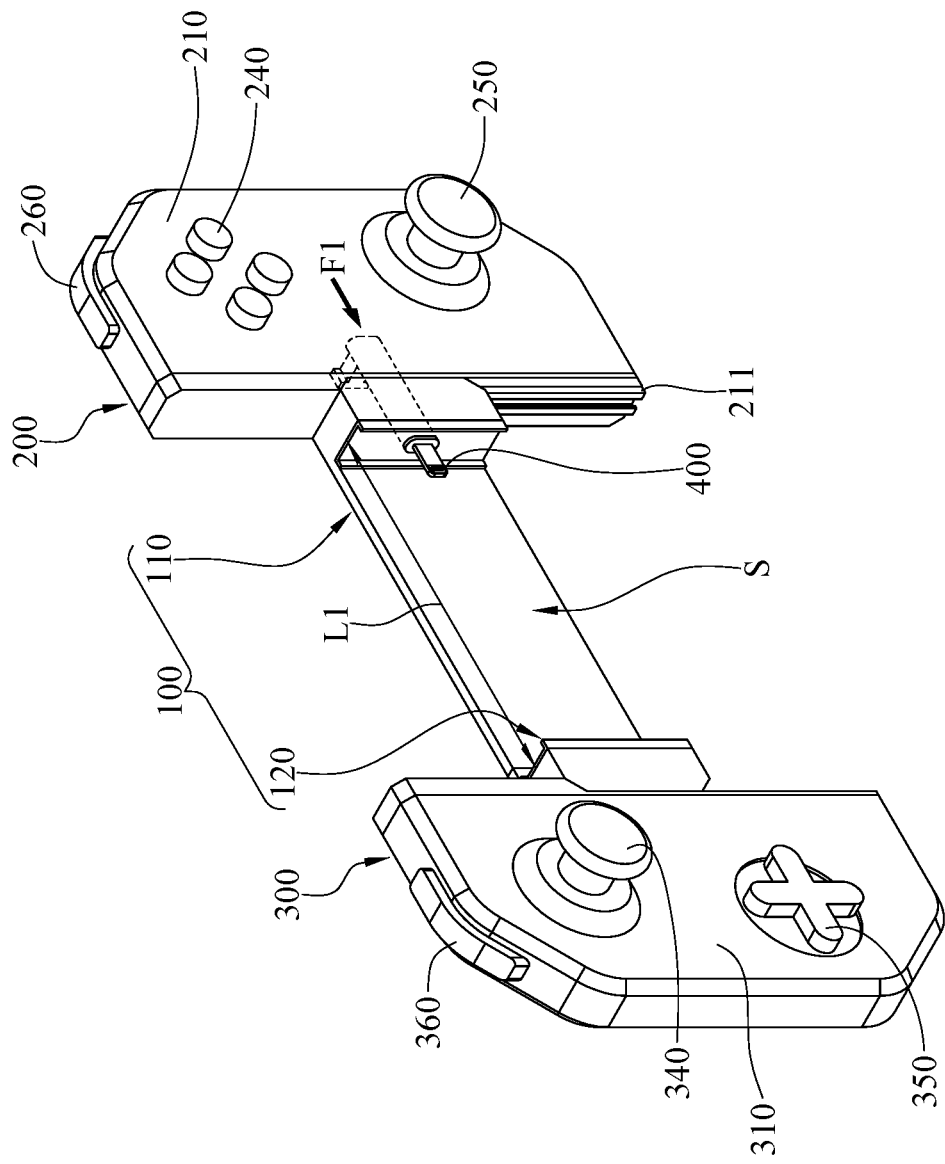
FIG. 2 is a perspective view of the game controller in FIG. 1 where an electrical connector sticks into an accommodation space of a holder.
Figure 3:
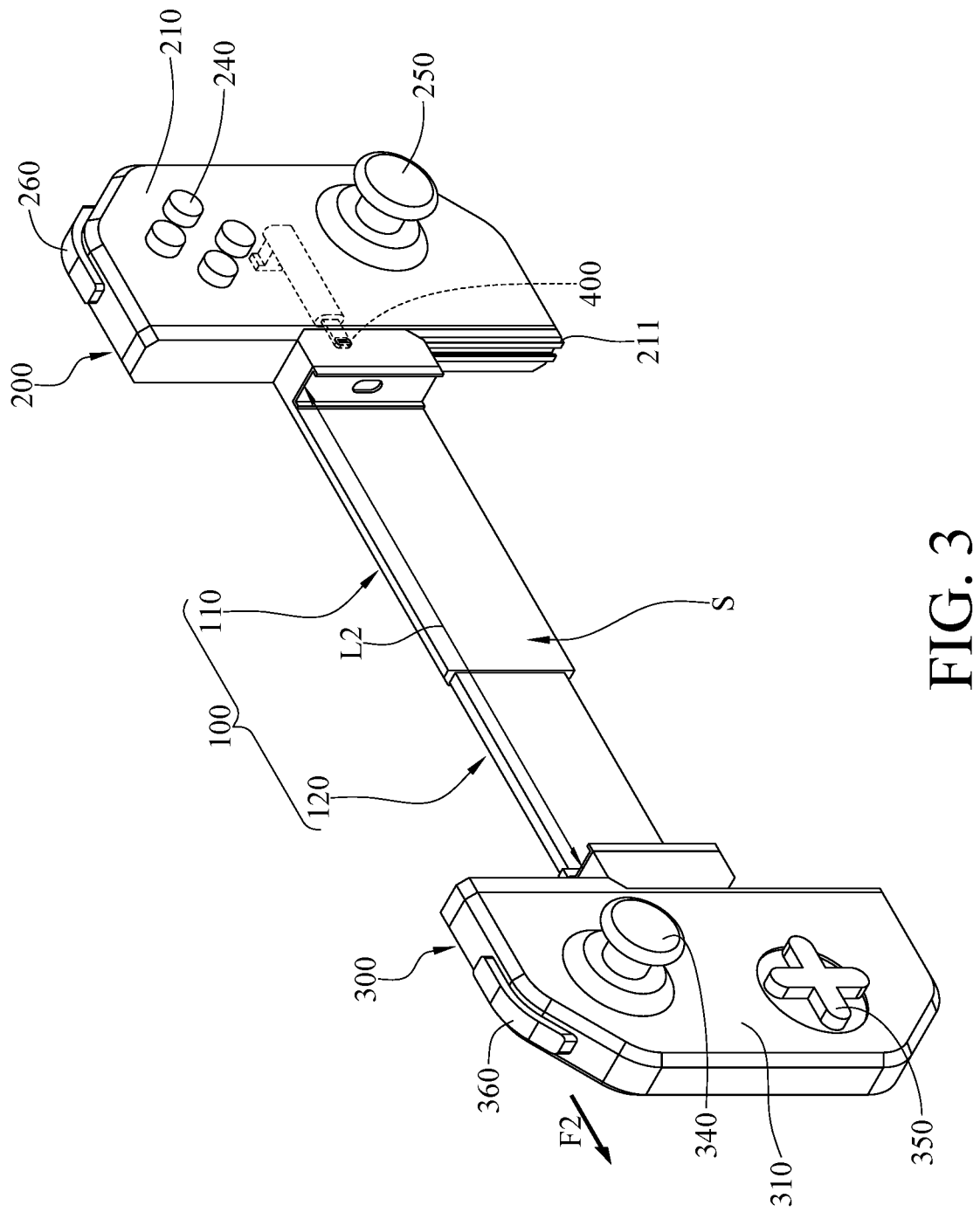
FIG. 3 is a perspective view of the game controller in FIG. 1 where the holder is stretched out.
Figure 4:
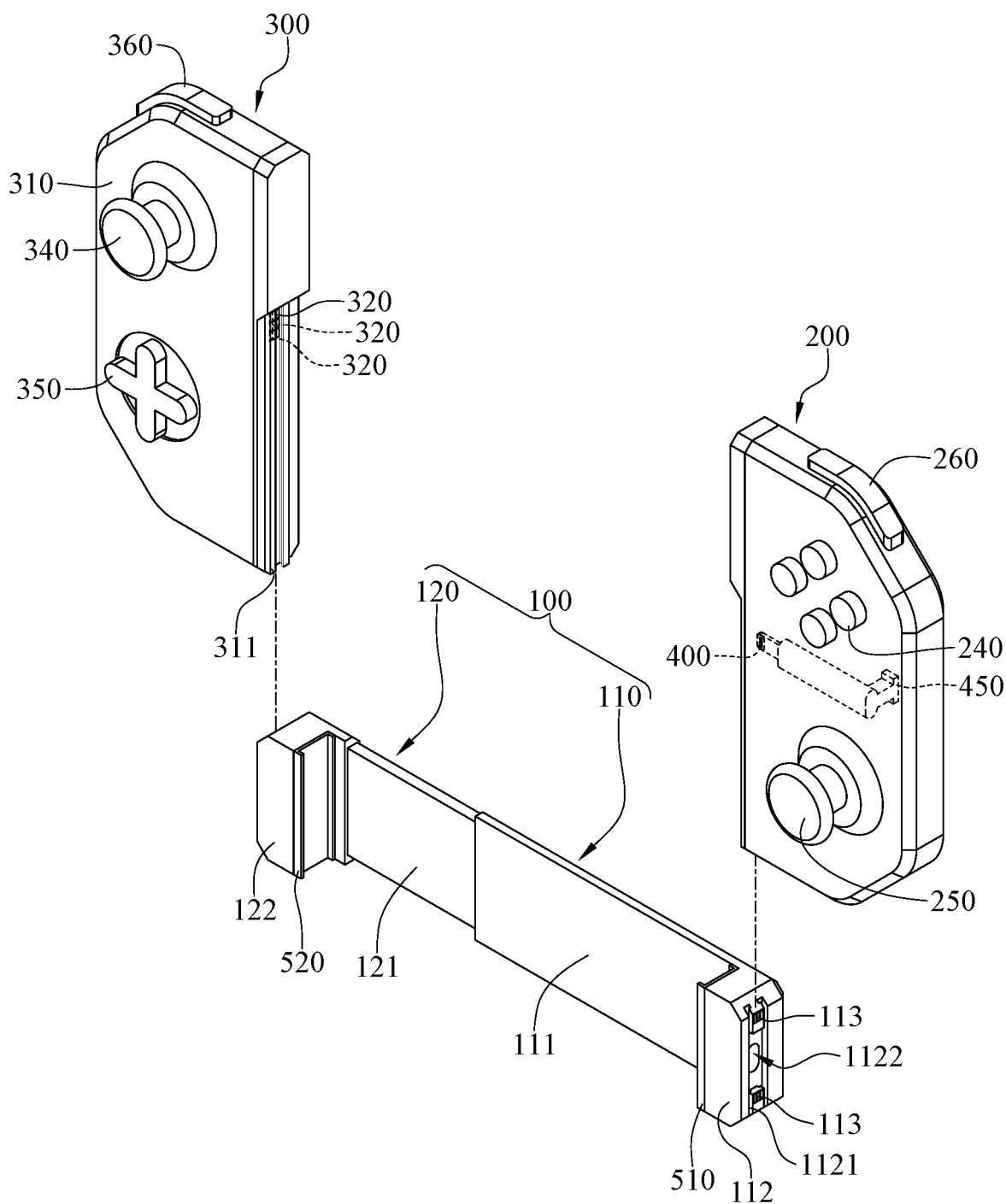
FIG. 4 is an exploded view of the game controller in FIG. 1.
Figure 5:
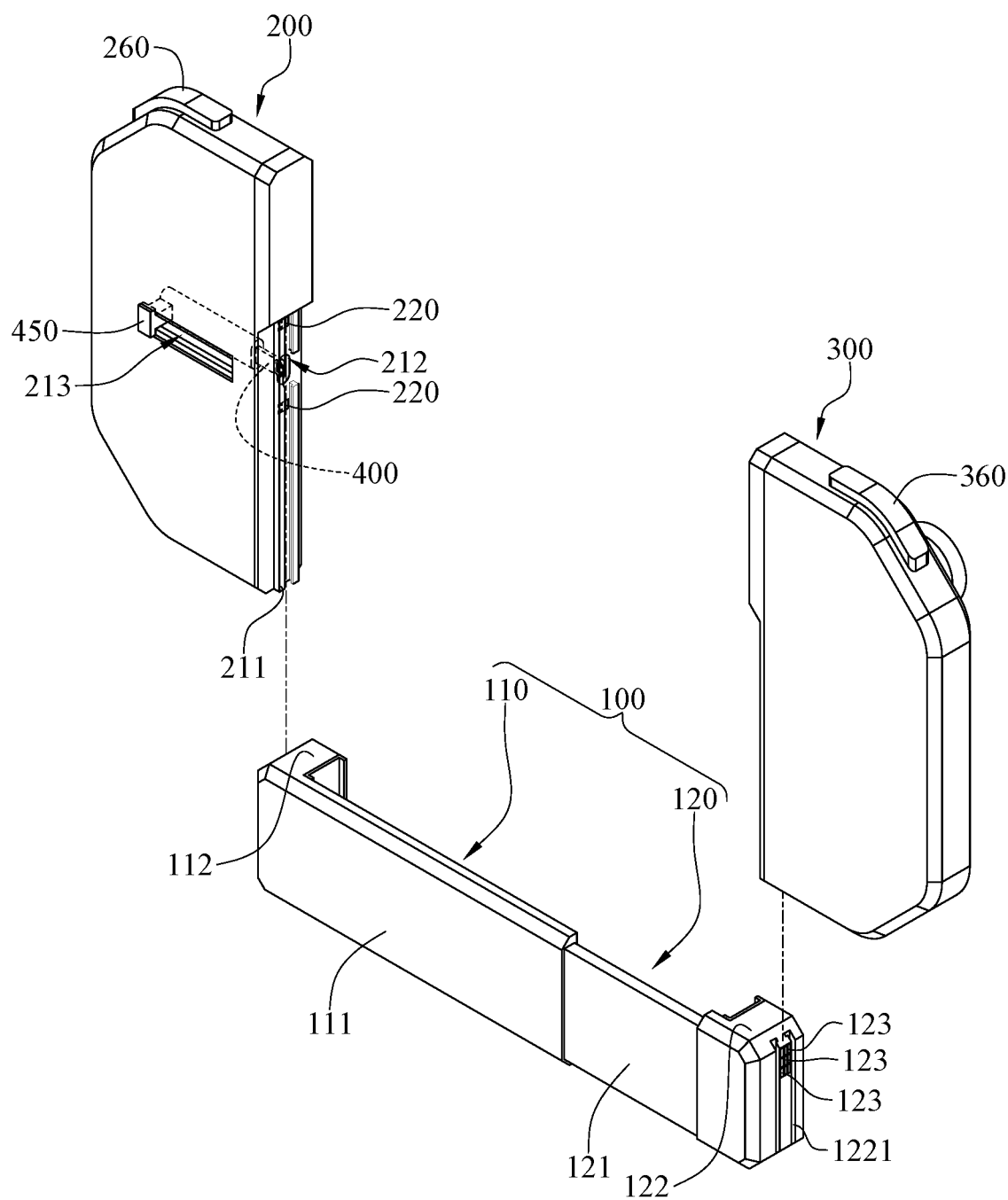
FIG. 5 is another exploded view of the game controller in FIG. 1.

Referring to FIGS. 1 to 5, FIG. 1 is a perspective view of a game controller 10 according to one embodiment of the disclosure, FIG. 2 is a perspective view of the game controller 10 in FIG. 1 where an electrical connector 400 sticks into an accommodation space S of a holder 100, FIG. 3 is a perspective view of the game controller 10 in FIG. 1 where the holder 100 is stretched out, FIG. 4 is an exploded view of the game controller 10 in FIG. 1, and FIG. 5 is another exploded view of the game controller 10 in FIG. 1.

In this embodiment, the game controller 10 is adapted for a mobile device 20. The mobile device 20 is, for example, a smart phone or a tablet computer. The game controller 10 includes a holder 100, two control handles 200 and 300, and an electrical connector 400. The holder 100 includes a first support 110 and a second support 120. The second support 120 is slidably disposed on the first support 110. The first support 110 and the second support 120 together form an accommodation space S, and the second support 120 is slidable relative to the first support 110 along a direction F2 or a direction opposite to the direction F2 to adjust a length L1 and L2 of the holder 100; that is, a length of the accommodation space S of the holder 100 is adjustable for accommodating the mobile device 20 with different size. Specifically, the first support 110 includes a first slidable part 111 and a first clamp part 112. The first clamp part 112 is connected to the first slidable part 111. The second support 120 includes a second slidable part 121 and a second clamp part 122. The second clamp part 122 is connected to the second slidable part 121. The second slidable part 121 is slidably disposed on the first slidable part 111, and the accommodation space S is formed between the second clamp part 122 and the first clamp part 112.

The control handles 200 and 300 are respectively and removably mounted on two opposite sides of the holder 100. Specifically, the first clamp part 112 has a first mount structure 1121, and the second clamp part 122 has a first mount structure 1221. The control handle 200 includes a main body 210 and a plurality of signal input components 240-260 disposed on the main body 210, and the control handle 300 includes a main body 310 and a plurality of signal input components 340-360 disposed on the main body 310. The main body 210 has a second mount structure 211, and the main body 310 has a second mount structure 311. The first mount structures 1121 and 1221 and the second mount structures 211 and 311 are respectively, for example, grooves and protrusions mating each other. The second mount structures 211 and 311 are respectively and slidably disposed on the first mount structures 1121 and 1221, such that the control handles 200 and 300 are respectively and slidably mounted on the two opposite sides of the holder 100.

In this embodiment, the control handles 200 and 300 are removable from the holder 100, but the present disclosure is not limited thereto; in some other embodiments, the control handles may be irremovably fixed to the holder.

The control handle 200 has a chamber 212, and the first clamp part 112 of the first support 110 of the holder 100 has a through hole 1122. The through hole 1122 is aligned with the chamber 212, and the electrical connector 400 is slidably located in the chamber 212 and the through hole 1122. The control handle 200 further has a slot 213 connected to the chamber 212. The game controller 10 further includes an extension component 450 fixed to the electrical connector 400 and slidably located in the slot 213. In addition, the extension component 450 is exposed to outside of the control handle 200 from the slot 213, such that the electrical connector 400 can be moved relative to the control handle 200 along a direction F1 or a direction opposite to the direction F1 by operating the extension component 450. Therefore, the electrical connector 400 is slidably disposed on the control handle 200, such that the electrical connector 400 is slidable relative to the control handle 200 in the direction F1 so as to be partially located in the accommodation space S or withdrawn from the accommodation space S along the direction opposite to the direction F1. Furthermore, the slidable direction (e.g., the direction F1) of the electrical connector 400 is substantially perpendicular to the slidable direction (e.g., a direction A shown in FIG. 6) of the control handle 200.

In this embodiment, the game controller 10 further includes two elastic pads 510 and 520. The elastic pads 510 and 520 are respectively and removably disposed on the first clamp part 112 and the second clamp part 122. The mobile device 20 can be firmly clamped by the first clamp part 112 of the first support 110 and the second clamp part 122 of the second support 120 via the elastic pads 510 and 520.

Note that the quantity of the elastic pads 510 and 520 are not restricted in the disclosure; in some other embodiments, the game controller may include only one elastic pad, and this elastic pad may be disposed on the first clamp part or the second clamp part.

In this embodiment, the elastic pads 510 and 520 are respectively removable from the first clamp part 112 and the second clamp part 122, but the present disclosure is not limited thereto; in some other embodiments, the elastic pads may be irremovable from the first clamp part and the second clamp part.

In this embodiment, the holder 100 has a transmission wire (not shown) disposed therein. The control handles 200 and 300 are electrically connected to each other via the transmission wire. Specifically, the first support 110 of the holder 100 further includes a plurality of first electrical contacts 113. The second support 120 of the holder 100 further includes a plurality of second electrical contacts 123. The second electrical contacts 123 are electrically connected to the first electrical contacts 113 via the transmission wire. The control handle 200 further includes a plurality of third electrical contacts 220 disposed on the main body 210, and the control handle 300 further includes a plurality of third electrical contacts 320 disposed on the main body 310. When the control handles 200 and 300 are respectively mounted on the first clamp part 112 of the first support 110 and the second clamp part 122 of the second support 120, the third electrical contacts 220 and 320 are respectively in electrical contact with the first electrical contacts 113 and the second electrical contacts 123.

Figure 6:
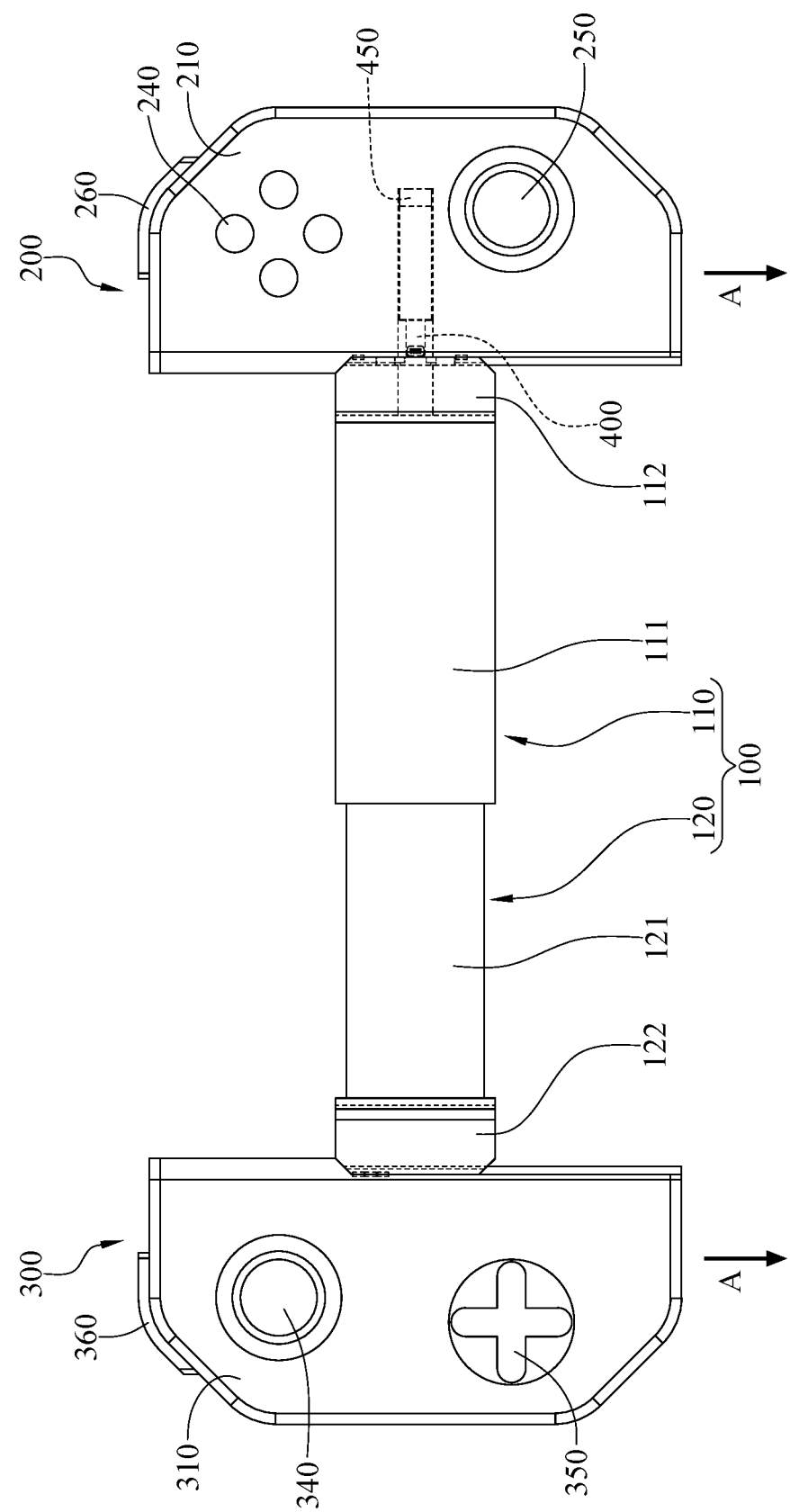
FIGS. 6 to 8 show an operation of the game controller in FIG. 1.
Figure 7:
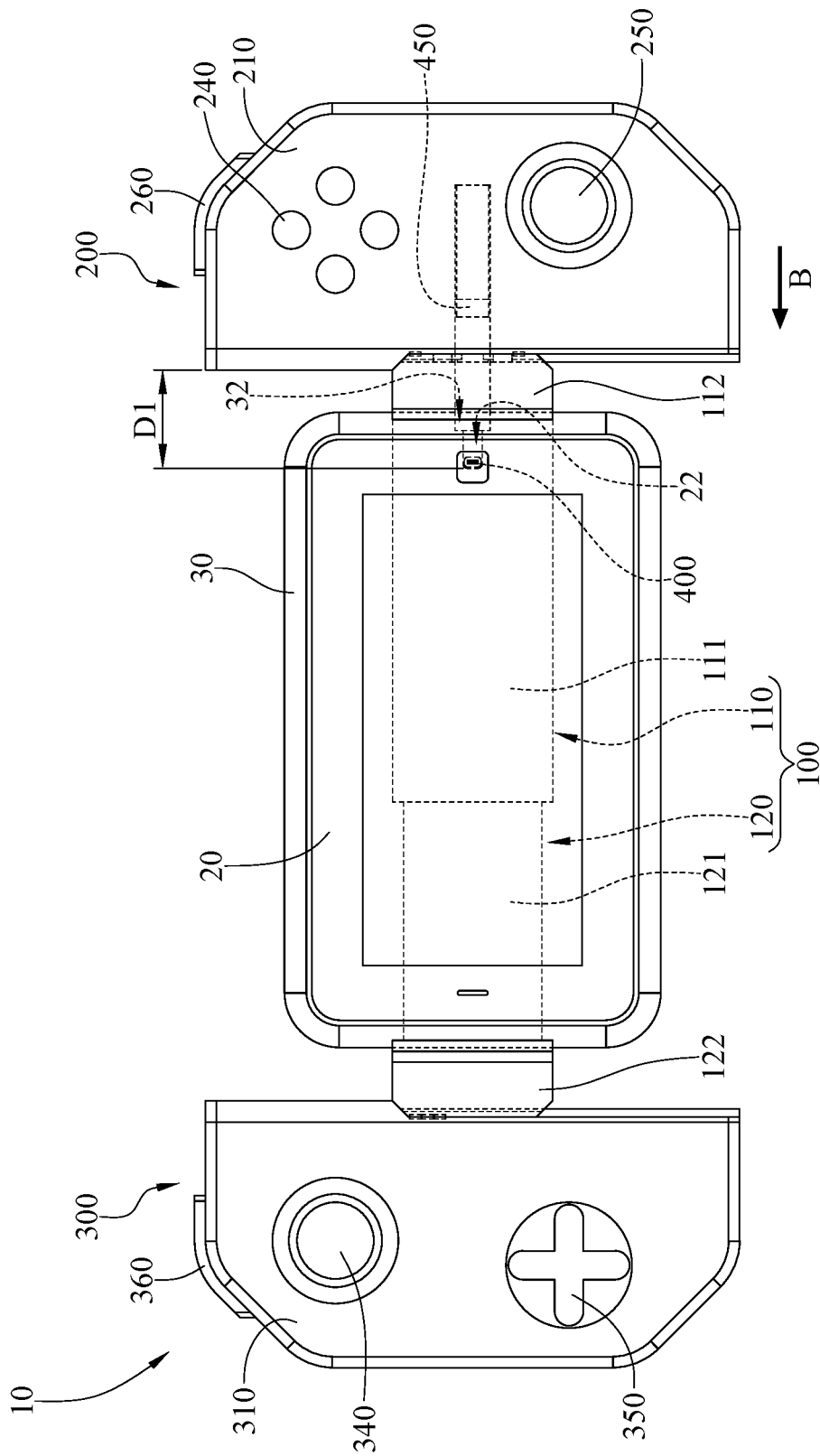
Figure 8:
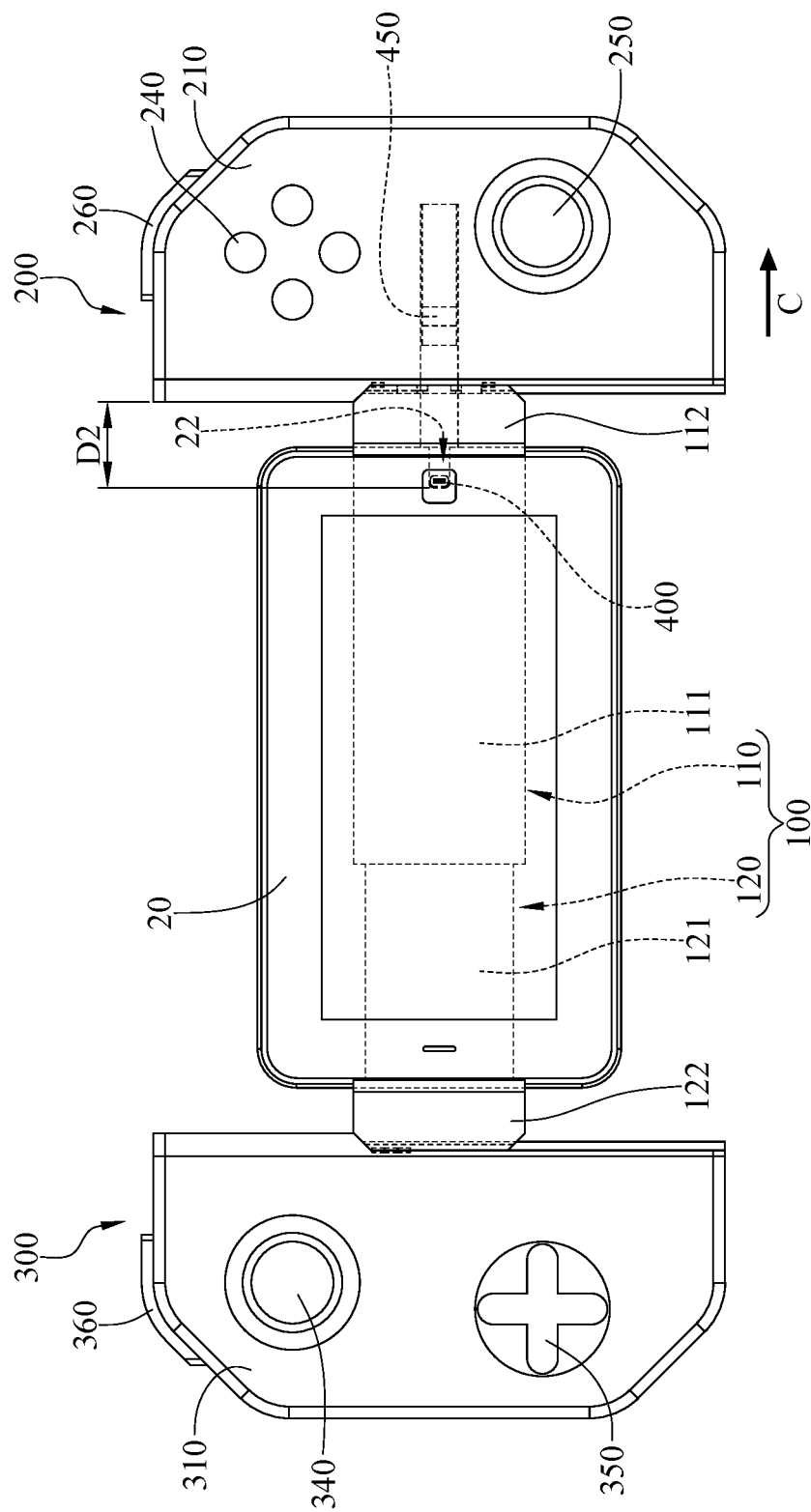

Then, referring to FIGS. 6 to 8, FIGS. 6 to 8 show an operation of the game controller 10 in FIG. 1.

As shown in FIG. 6, the installation of the game controller 10 is firstly introduced. The first step is to maintain the electrical connector 400 to be hidden in the control handle 200, then slide the control handles 200 and 300 relative to the first support 110 and the second support 120 along the direction A. By doing so, the control handles 200 and 300 are respectively mounted on the first support 110 and the second support 120 of the holder 100.

Then, as shown in FIG. 7, when the mobile device 20 with a protective casing 30 is installed on the holder 100, the electrical connector 400 can be moved along a direction B, and a length D1 of the electrical connector 400 protruding from the control handle 200 can be determined according to the thickness of the protective casing 30 for ensuring the insertion of the electrical connector 400 into an electrical jack 22 of the mobile device 20.

As shown in FIG. 8, when the mobile device 20 without the protective casing is installed on the holder 100, the electrical connector 400 is required to be adjusted along a direction C compared to the position of the electrical connector 400 shown in FIG. 7 for shortening the length D2 of the electrical connector 400 protruding from the control handle 200, thereby ensuring the insertion of the electrical connector 400 into the electrical jack 22 of the mobile device 20.

According to the game controller as discussed in the above embodiment, the electrical connector is slidable relative to the control handle, such that the length of the electrical connector protruding from the control handle can be adjusted according to the total length of the mobile device with or without the protective casing. Therefore, the game controller is suitable for both cases where the mobile device is with and without the protective casing.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A game controller, adapted for a mobile device, comprising:
   a holder, having an accommodation space and a through hole communicating with the accommodation space, wherein the accommodation space is configured to accommodate the mobile device;
   two control handles, respectively mounted on two opposite sides of the holder, wherein one of the control handles has a chamber, and the through hole of the holder is aligned with the chamber; and
   an electrical connector, slidably disposed in the chamber, wherein the electrical connector is slidable to be partially located in the accommodation space or withdrawn from the accommodation space through the through hole of the holder.

2. The game controller according to claim 1, wherein the control handles are respectively and removably mounted on the two opposite sides of the holder.

3. The game controller according to claim 1, wherein the holder comprises a first support and a second support, the second support is slidably disposed on the first support, the first support and the second support together form the accommodation space, and the second support is slidable relative to the first support to adjust a length of the accommodation space.

4. The game controller according to claim 3, wherein the first support comprises a first slidable part and a first clamp part connected to the first slidable part, the second support comprises a second slidable part and a second clamp part connected to the second slidable part, the second slidable part is slidably disposed on the first slidable part, and the accommodation space is formed between the second clamp part and the first clamp part.

5. The game controller according to claim 4, further comprising at least one elastic pad, wherein the at least one elastic pad is removably disposed on the first clamp part or the second clamp part.

6. The game controller according to claim 5, wherein the at least one elastic pad comprises two elastic pads, and the elastic pads are respectively disposed on the first clamp part and the second clamp part.

7. The game controller according to claim 4, wherein each of the first clamp part and the second clamp part has a first mount structure, each of the control handles comprises a main body and a plurality of signal input components disposed on the main body, each of the main bodies of the control handles has a second mount structure, the second mount structures are respectively and slidably disposed on the first mount structure of the first clamp part and the first mount structure of the second clamp part, such that the control handles are respectively and slidably mounted on the two opposite sides of the holder.

8. The game controller according to claim 7, wherein a slidable direction of the electrical connector is substantially perpendicular to slidable directions of the control handles.

9. The game controller according to claim 7, wherein a transmission wire is disposed in the holder, and the control handle are electrically connected to each other via the transmission wire.

10. The game controller according to claim 9, wherein the first support of the holder further comprises at least one first electrical contact, the second support of the holder further comprises at least one second electrical contact, the at least one second electrical contact is electrically connected to the at least one first electrical contact via the transmission wire, each of the control handles further comprises at least one third electrical contact disposed on the main body; when the control handles are respectively mounted on the first clamp part and the second clamp part, the third electrical contacts are respectively in electric contact with the at least one first electrical contact and the at least one second electrical contact.

* * * * *